United States Patent
Kikukawa et al.

(10) Patent No.: US 8,339,918 B2
(45) Date of Patent: Dec. 25, 2012

(54) OPTICAL READING METHOD AND OPTICAL READING SYSTEM

(75) Inventors: Takashi Kikukawa, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 1052 days.

(21) Appl. No.: 12/206,770

(22) Filed: Sep. 9, 2008

(65) Prior Publication Data

US 2009/0067314 A1 Mar. 12, 2009

(30) Foreign Application Priority Data

Sep. 12, 2007 (JP) .................................. 2007-236269

(51) Int. Cl.
*G11B 5/09* (2006.01)
*G11B 7/135* (2012.01)

(52) U.S. Cl. ................ 369/59.22; 369/280; 369/112.23; 369/44.35; 369/53.12

(58) Field of Classification Search ........................ None
See application file for complete search history.

(56) References Cited

U.S. PATENT DOCUMENTS

| | | | |
|---|---|---|---|
| 2004/0246870 A1* | 12/2004 | Kim et al. ........................ | 369/94 |
| 2005/0265199 A1* | 12/2005 | Nakano et al. ............. | 369/59.22 |
| 2006/0087947 A1* | 4/2006 | Minemura et al. ......... | 369/59.22 |
| 2007/0097822 A1* | 5/2007 | Iwanaga ....................... | 369/53.2 |
| 2008/0019261 A1* | 1/2008 | Nakai et al. ................. | 369/275.4 |

FOREIGN PATENT DOCUMENTS

| JP | 2006120233 A | 5/2006 |
|---|---|---|
| JP | 2007128590 A | 5/2007 |

OTHER PUBLICATIONS

Mishima et al., "150 GB, 6-layer Write Once Disc for Blu-Ray Disc System", Proc of SPIE 6282 628201-1 (2006).
Ichimura et al., "Proposal for a Multilayer Read-Only-Memory Optical Disk Structure", Appl Optics 45(8):1794-1803 (2006).
Ogawa et al. "Illustrated Guide to Blu-ray Discs", 1st edition, Ohmsha Ltd., pp. 28, 29, 80-82, 130-144, 151-155 (2006).
Hayashi et al., "New Equalizer Optimization Method for Partial Response Maximum Likelihood Systems Using Normal Equation with Sequenced Amplitude Margin", Japanese Journal of Applied Physics 44(5B):347-3481 (2005).

* cited by examiner

*Primary Examiner* — Wayne Young
*Assistant Examiner* — Dionne Pendleton
(74) *Attorney, Agent, or Firm* — Porzio, Bromberg & Newman, P.C.

(57) ABSTRACT

An optical reading system is provided to improve read signal quality with increasing its linear recording density. An optical recording medium in which the distance from a light incident surface to an information recording layer is less than 100 μm is irradiated with a laser beam through an objective lens and information stored in the information recording layer is read by means of a PRML detection method. At this time, the constraint length n in the PRML detection method is set to an integer which satisfies $0.5 \times (\lambda/NA)/(LV/f) - 1 < n < 0.5 \times (\lambda/NA)/(LV/f) + 1$, wherein λ represents the wavelength of the laser beam, NA represents the numerical aperture of the objective lens, LV represents the linear velocity of the optical recording medium when recording, and f represents a channel bit frequency when recording.

15 Claims, 6 Drawing Sheets

(A)

(B)

(C)

OPTICAL READING METHOD AND OPTICAL READING SYSTEM

CROSS REFERENCE TO RELATED APPLICATION

This application claims the benefit of Japanese Patent Application No. 2007-236269 filed on Sep. 12, 2007, the disclosure of which Application is incorporated by reference herein.

BACKGROUND OF THE INVENTION

1. Field of the Invention

The present invention relates to an optical reading method for reading information by irradiating an optical recording medium with a laser beam and an optical reading system.

2. Description of the Related Art

Conventionally, optical recording media such as CD-DAs, CD-ROMs, CD-Rs, CD-RWs, DVD-ROMs, DVD-Rs, DVD±RWs, DVD-RAMs, and the like are widely used to watch digital moving image contents and record digital data. Conversely, the recording capacity required of these kinds of optical recording media grows with each passing year and the so-called next-generation optical discs, which can store massive amounts of both moving images and data, have come into commercial use to meet such a requirement. In the next-generation optical discs, the wavelength of a laser beam used for recording and reading is shortened to 405 nm in order to increase their recording capacity.

In the Blu-ray Disc (BD) standard, being one of the next-generation DVD standards, for example, the numerical aperture of an objective lens is set to 0.85 in order to record and read 25 GB of data on and from a single recording layer.

It should also be noted that it is expected that the amount of moving images and data will increase more and more in the future. Thus, in order to increase the capacity of an optical recording medium, a method for increasing the linear recording density of an information recording layer in the above described optical recording medium has been investigated. Also, as described in the articles of I. Ichimura et. al., Appl. Opt, 45, 1974-1803(2006) and K. Mishima et. al., Proc. of SPIE, 6282, 62820I(2006), a method of increasing the capacity of an optical recording medium by providing multiple information recording layers has been investigated.

In order to increase the linear recording density of the information recording layer, a recording mark has to be reduced to a small size. However, when $\lambda$ represents the wavelength of a laser beam and NA represents the numerical aperture of an objective lens, if a sequence of a recording mark and a space each having a size of $(\lambda/NA)/4$ or less is contained in a particular encoding signal, the amplitude of the read signal from a train of recording marks and spaces becomes almost zero. Therefore, a so-called resolution limit exists.

According to a study undertaken by the inventors, although this study was publicly unknown at the time of filing of the present application, when the size of a minimum recording mark or a minimum space is $1.1 \times (\lambda/NA)/4$ or less, the amplitude of a read signal from a train of the minimum recording marks and spaces becomes extremely small and a practical output cannot be obtained even with the use of an equalizer.

A PRML (partial response maximum likelihood) detection method is, however, known as one technology used for solving the problem of the resolution limit. In the PRML detection method, binary data recorded on an information recording layer are estimated on the basis of an electrical analog signal detected during optical reading. In the PRML detection method, the appropriate reference class characteristic (constraint length) of the PR (partial response) is selected in accordance with the reading characteristics. The constraint length needs to be determined in consideration with how much a laser beam spot for reading a target recording mark is susceptible to adjacent recording marks (optical interference), in other words, how much the state of adjacent recording marks/spaces add a constraint to the read signal output.

When T represents one unit clock period in a reading control system, the case where there is a train of recording marks/spaces with a length corresponding to 7 T in the beam spot is taken as an example. In this case, since the output value provided by the reflected light of the recording mark or space positioned in the center of the beam spot includes the reflected light of the train of recording marks/spaces with the length corresponding to 7 T (including the center), it is preferable that the constraint length n is set to be at least 5 or more.

In PRML detection with a constraint length of 5, it is assumed that when a sign bit "1" of the target recording mark is read, 5 bits in total including the adjacent sign bits are constrained (susceptible) As a result, a reading response waveform is equalized and decoded on the basis of being expressed by the result of the convolution of, for example, "12221."

Accordingly, generally speaking, if the constraint length is set to be large, it becomes possible to include the optical interference of recording marks that are further away with respect to a recording mark, wherein the recording mark is the reading target in the calculation being undertaken. Taking the case where there is a train of recording marks/spaces with a length corresponding to 7 T in the beam spot as an example, setting the constraint length at 7 makes it possible to equalize an outputted waveform into a waveform the shape of which is close to the actual outputted waveform, and therefore decode it with great precision. However, there is a problem in that the scale of a calculation circuit exponentially increases with an increase in the constraint length. Therefore, by improving precision in decoding using the devised ML processing method, the constraint length can be set at 5, even in the case where there is a train of recording marks/spaces with a length corresponding to 7 T in the beam spot.

However, according to the unpublished study undertaken by the inventors, in the method used to increase the constraint length in order to increase recording capacity, which is based on the idea that precision increases with an increase in the constraint length (in principle), when an information recording layer is brought close to the light incident surface of an optical recording medium because of multiple layers or the like, the PRML detection processing does not function efficiently due to the existence of extraneous matters such as fingerprints and the like and reading quality decreases.

SUMMARY OF THE INVENTION

The present invention has been made in view of the above problems. Accordingly, it is an object of the invention to provide an optical reading system which can stably read information even in a case where there is a scratch in the surface of an optical recording medium or extraneous matters adhered thereto.

The foregoing object is achieved by the following means obtained by the extensive studies by the inventors.

A first aspect of the present invention for achieving the foregoing object is an optical reading method. The optical reading method includes irradiating an optical recording medium, in which a distance from a light incident surface to an information recording layer is less than 100 µm, with a laser beam through an objective lens to read information recorded on the information recording layer by a PRML detection method. In this optical reading method, a constraint length n in the PRML detection method is set to an integer which satisfies $0.5\times(\lambda/NA)/(LV/f)-1<n<0.5\times(\lambda/NA)/(LV/f)+1$, wherein $\lambda$ represents a wavelength of a laser beam, NA represents a numerical aperture of the objective lens, LV represents a linear velocity of the optical recording medium when recording, and f represents a channel bit frequency when recording.

A second aspect of the present invention for achieving the foregoing object is the signal evaluation method according to the first aspect, wherein the constraint length n is set to an integer which satisfies $0.5\times(\lambda/NA)/(LV/f)<n<0.5\times(\lambda/NA)/(LV/f)+1$.

A third aspect of the present invention for achieving the foregoing object is the signal evaluation method according to any of the first and second aspects, wherein, when $d_{min}$ represents a physical length of a minimum mark recorded on the information recording layer, the $d_{min}$ satisfies $d_{min}<1.1\times(\lambda/4)/NA$.

A fourth aspect of the present invention for achieving the foregoing object is the signal evaluation method according to any of the foregoing aspects, wherein the expression of $(\lambda/NA)/(LV/f)>6$ is satisfied, where $\lambda$ represents the wavelength of the laser beam, NA represents the numerical aperture of the objective lens, LV represents the linear velocity of the optical recording medium when recording, and f represents the channel bit frequency when recording.

A fifth aspect of the present invention for achieving the foregoing object is the signal evaluation method according to the fourth aspect, wherein the expression of $(\lambda/NA)/(LV/f)>7$ is satisfied, where $\lambda$ represents the wavelength of the laser beam, NA represents the numerical aperture of the objective lens, LV represents the linear velocity of the optical recording medium when recording, and f represents the channel bit frequency when recording.

A sixth aspect of the present invention for achieving the foregoing object is the signal evaluation method according to any of the foregoing aspects, wherein the distance from the light incident surface to the information recording layer is 80 µm or less.

A seventh aspect of the present invention for achieving the foregoing object is the signal evaluation method according to the sixth aspect, wherein the distance from the light incident surface to the information recording layer is 75 µm or less.

An eighth aspect of the present invention for achieving the foregoing object is the signal evaluation method according to any of the foregoing aspects, wherein the optical recording medium is provided with a plurality of information recording layers.

A ninth aspect of the present invention for achieving the foregoing object is an optical reading method. The optical reading method includes irradiating an optical recording medium, in which a distance from a light incident surface to an information recording layer is less than 100 µm, with a laser beam through an objective lens to read information recorded on the information recording layer by a PRML detection method. In this optical reading method, a constraint length n in the PRML detection method is set to an integer which satisfies $0.5\times(\lambda/NA)/W-1<n<0.5\times(\lambda/NA)/W+1$, wherein $\lambda$ represents a wavelength of the laser beam, NA represents a numerical aperture of the objective lens, and W represents a length of a channel bit when recording.

A tenth aspect of the present invention for achieving the foregoing object is an optical reading system which includes: a rotation driving unit for rotating an optical recording medium in which a distance from a light incident surface to an information recording layer is less than 100 µm; a laser beam source for generating a laser beam; an objective lens for collecting the laser beam to irradiate the optical information recording medium with; a photoelectric conversion unit for receiving reflected light of the laser beam and converting it into an electrical signal; and a PRML processing unit for reading a signal by a PRML detection method on the basis of the electrical signal. In this optical reading system, a constraint length n in the PRML processing unit is set to an integer which satisfies $0.5\times(\lambda/NA)/(LV/f)-1<n<0.5\times(\lambda/NA)/(LV/f)+1$, wherein $\lambda$ represents a wavelength of the laser beam, NA represents a numerical aperture of the objective lens, LV represents a linear velocity of the optical recording medium when recording, and f represents a clock frequency of a reading system.

According to the present invention, when the optical recording medium is read, it is possible to determine the constraint length in the PRML detection method on the assumption of the adhesion of extraneous matters in the future. Thus, the present invention has the great effects of stabilizing the quality of a signal reading characteristic and rationally increasing recording capacity.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

An embodiment of the present invention will be hereinafter described in detail with reference to the drawings.

Figure 1:
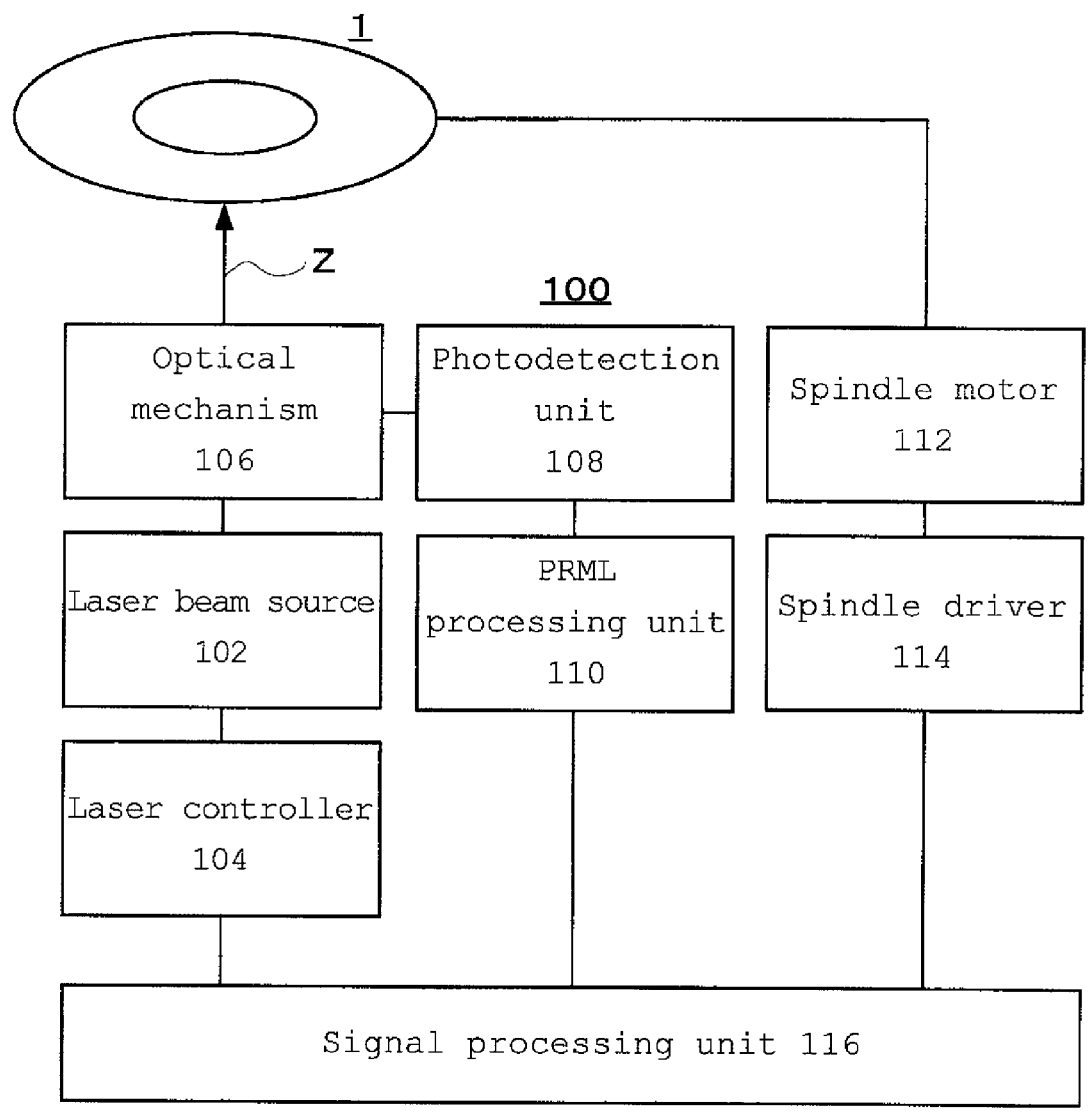
FIG. 1 is a block diagram showing the configuration of an optical reading system according to an embodiment of the present invention.

FIG. 1 shows the configuration of an optical reading system 100 which embodies an optical reading method according to one embodiment of the present invention. The optical reading system 100 includes: a laser beam source 102 which generate a laser beam Z used for reading; a laser controller 104 which controls the laser beam source 102; an optical mechanism 106 which leads the laser beam Z to an optical recording medium 1; a photodetection unit 108 which detects reflected light of the laser beam Z; a PRML processing unit 110 which decodes the detection information by the photodetection unit 108 by means of a PRML detection method; a spindle motor 112 which rotates the optical recording medium 1; a spindle driver 114 which controls the rotation of the spindle motor 112; and a signal processing unit 116 which exchanges decoded read data with a CPU (central processing unit), which is not specifically illustrated.

The laser beam source 102 being a semiconductor laser emits the laser beam Z in accordance with the control of the laser controller 104. The optical mechanism 106 is provided with an objective lens and a polarization beam splitter and can appropriately bring the laser beam Z into focus on an information recording layer. The polarization beam splitter takes out reflected light from the information recording layer to lead it into the photodetection unit 108. The photodetection unit 108 being a photodetector receives the reflected light of the laser beam Z, converts it into an electrical signal, and outputs the electrical signal to the PRML processing unit 110 as a read signal. The PRML processing unit 110 decodes the read signal and outputs a decoded binary detected signal to the signal processing unit 116.

Furthermore, in the optical reading system 100, the wavelength $\lambda$ of the laser beam Z is set to 400 to 410 nm. The numerical aperture NA of the objective lens 106A of the optical mechanism 106 is set to 0.84 to 0.86. To be more specific, the wavelength $\lambda$ of the laser beam Z is set to 405 nm and the numerical aperture NA of the objective lens 106A is set to 0.85. The clock frequency f of this optical reading system is set to 66 MHz and the linear velocity LV of the optical recording medium 1 the rotation of which is controlled by the spindle driver 114 is set to 4.1 m/s.

To initiate reading of information from the optical recording medium 1, the laser beam source 102 emits the laser beam Z at a predetermined reading power and irradiates the information recording layer of the optical recording medium 1 with the laser beam Z. The laser beam Z is reflected from the information recording layer and is taken out through the optical mechanism 106 as a real read signal (hereinafter called real signal) by the photodetection unit 108.

Figure 2:
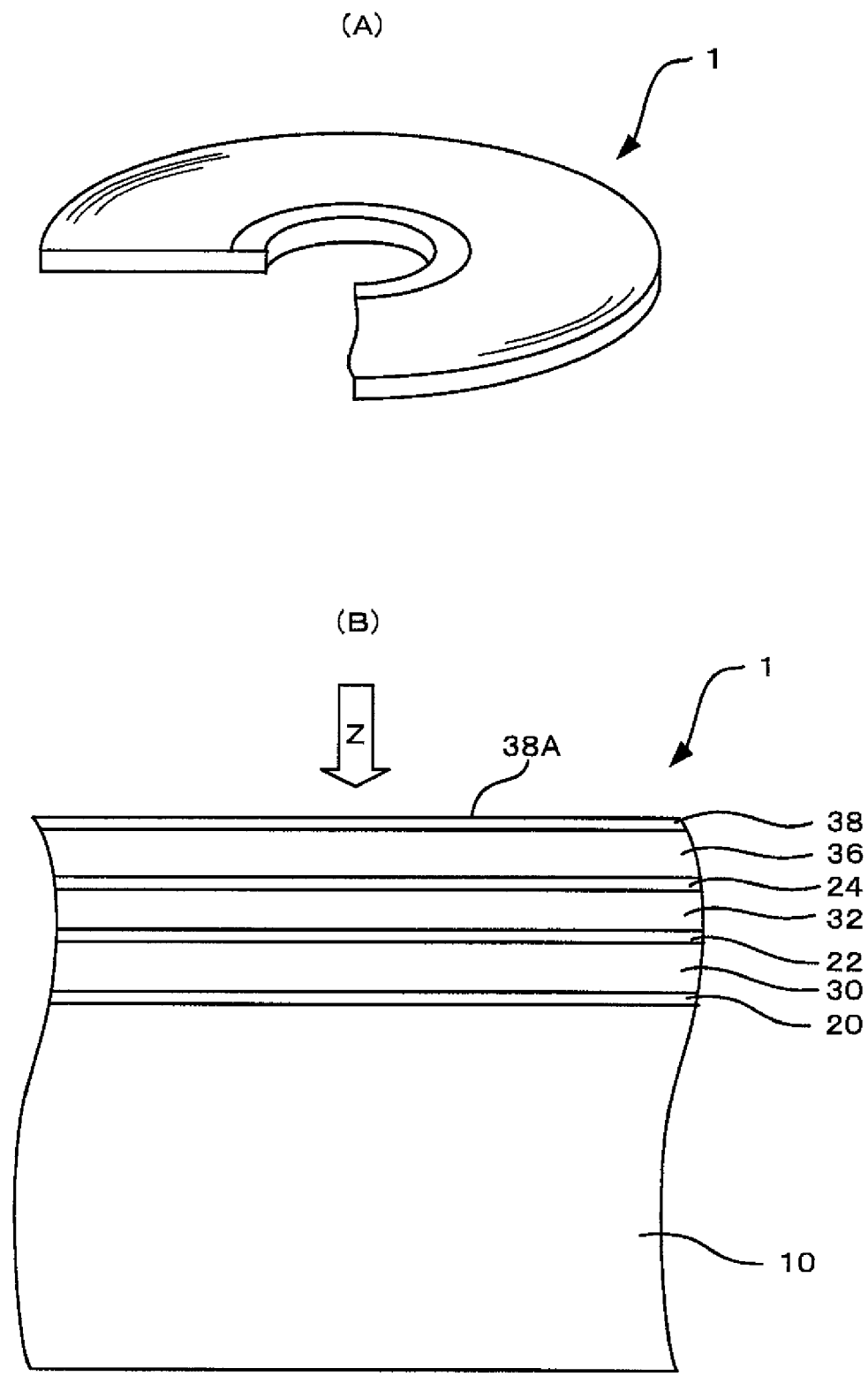
FIG. 2(A) is a perspective view showing an optical recording medium according to the embodiment of the present invention.
FIG. 2(B) is an enlarged cross-sectional view.

FIG. 2(A) shows the optical recording medium 1 according to the embodiment of the present invention. The optical recording medium 1 has the shape of a disc having an outer diameter of approximately 120 mm and a thickness of approximately 1.2 mm. As shown in FIG. 2(B) in enlargement, the optical recording medium 1 is composed of a substrate 10, an L0 information recording layer 20, a first spacer layer 30, an L1 information recording layer 22, a second spacer layer 32, an L2 information recording layer 24, a cover layer 36, and a hard coat layer 38 which are stacked in this order.

All of the first and second spacer layers 30 and 32, the cover layer 36, and the hard coat layer 38 can transmit light and hence allow the laser beam incident from the outside to pass therethrough. As a result, using the laser beam Z which is incident on a light incident surface 38A of the hard coat layer 38 makes it possible to record and read information on and from all of the L0 to L2 information recording layers 20, 22, and 24.

The L2 information recording layer 24 is the nearest information recording layer to the light incident surface 38A of the optical recording medium 1, and the L0 information recording layer 20 is the farthest information recording layer from the light incident surface 38A. The recording capacity of each of the information recording layers 20, 22, and 24 is 30 GB. Alternatively, the recording capacity of each information recording layer may differ from one another.

The substrate 10 is a disc-shaped member having a thickness of approximately 1.1 mm, and various kinds of material such as, for example, glass, ceramic, and resin are available as the material thereof. A polycarbonate resin is used here. Examples of the available resin include olefin resins, acrylic resins, epoxy resins, polystyrene resins, polyethylene resins, polypropylene resins, silicone resins, fluororesins, ABS resins, urethane resins, and the like, in addition to polycarbonate resins. Of these, the polycarbonate resins and the olefin resins are preferable due to ease of processing and molding. In the face of the substrate 10 on the side of the information recording layer, grooves, lands, pit rows, or the like is formed depending on the intended use.

The first spacer layer 30 is stacked between the L0 information recording layer 20 and the L1 information recording layer 22. The second spacer layer 32 is stacked between the L1 information recording layer 22 and the L2 information recording layer 24. The first and second spacer layers 30 and 32 have the function of keeping distances among the information recording layers 20, 22, and 24. In the surface of each of the spacer layers 30 and 32 on the side of the light incident surface 38A, grooves (lands), pit rows, or the like are formed. Various kinds of materials are available for the first and second spacer layers 30 and 32 but, as described above, it is necessary to use light-transmitting material for allowing the laser beam Z to pass therethrough. It is also preferable to use, for example, an ultraviolet curable acrylic resin.

In the optical recording medium 1, the thickness of the first spacer layer 30 is set to 17 μm and the thickness of the second spacer layer 32 is set to 13 μm. Making the thicknesses of the spacer layers 30 and 32 different from each other is helpful in reducing the interference of the read signal. The thickness of the hard coat layer 38 is set to 2 μm and the thickness of the cover layer 36 is set to 68 μm.

As a result, in the optical recording medium 1, the L1 information recording layer 22 and the L2 information recording layer 24 are set at distances of less than 100 μm from the light incident surface 38A. In particular, the L2 information recording layer 24 is set at a distance of 80 μm or less from the light incident surface 38A, and 75 μm or less in particular.

The L0 to L2 information recording layers 20, 22, and 24 are layers for storing data. As the form of storing data, there are a read-only type in which data is written in advance and cannot be overwritten and a recordable type in which data is rewritable by a user. Either is adoptable. When the form of storing data is the recordable type, to be more specific, there are a write-once read-many type in which data cannot be rewritten in an area where data has been written once and a rewritable type in which data is erasable and rewritable in an area where data has been written. Either is adoptable. It is also possible to make the form of storing data different from one another in the respective information recording layers 20, 22, and 24.

When the form of storing data in the L0 to L2 information recording layers 20, 22, and 24 is the read-only type, tangential pit rows are formed in the surfaces of the substrate 10 and the first and second spacer layers 30 and 32 to store information therein. In this case, a reflection film is formed in each of the L0 to L2 information recording layers 20, 22, and 24. The laser beam Z when reading is reflected by the reflection films of the L0 to L2 information recording layers 20, 22, and 24. Then, the pit row which comes into contact with each of the information recording layers 20, 22, and 24 varies the reflectivity of the surface to form a read waveform. The L1 and L2 information recording layers 22 and 24 also require high light transmittance, so that the reflection films thereof are made thin. In other words, it is necessary that the L1 and L2 information recording layers 22 and 24 have both characteristics of certain light transmittance and certain light reflectivity.

When the form of storing data in the L0 to L2 information recording layers 20, 22, and 24 is the recordable type, a spiral groove (or land) is formed on the surfaces of the substrate 10 and the first and second spacer layers 30 and 32. In this case, a recording film on which a recording mark can be formed by the energy of the laser beam Z is formed in each of the L0 to L2 information recording layers 20, 22, and 24. The groove functions as a guide track of the laser beam Z when recording data. By modulating the energy intensity of the laser beam Z traveling along the groove, recording marks are formed in the information recording layers 20, 22, and 24 in the grooves. When the form of storing data is the write-once read-many type, the recording marks are irreversibly formed and not erasable. When the form of storing data is rewritable type, on the other hand, the recording marks are reversibly formed and hence erasable and can be formed again. The recording films also have to have both characteristics of certain light transmittance and certain light reflectivity. The recording marks are formed over the groove here, but the recording marks may be formed over a land or both the groove and the land.

The recording capacity of each of the information recording layers 20, 22, and 24 is set to 30 GB, as described above. The recording capacity, however, is determined based on the combination of the size of a recording area and the magnitude of the linear recording density. Since the recording area of each of the information recording layers 20, 22, and 24 has a limit, the linear recording density is increased to increase the recording capacity in general.

Figure 3:
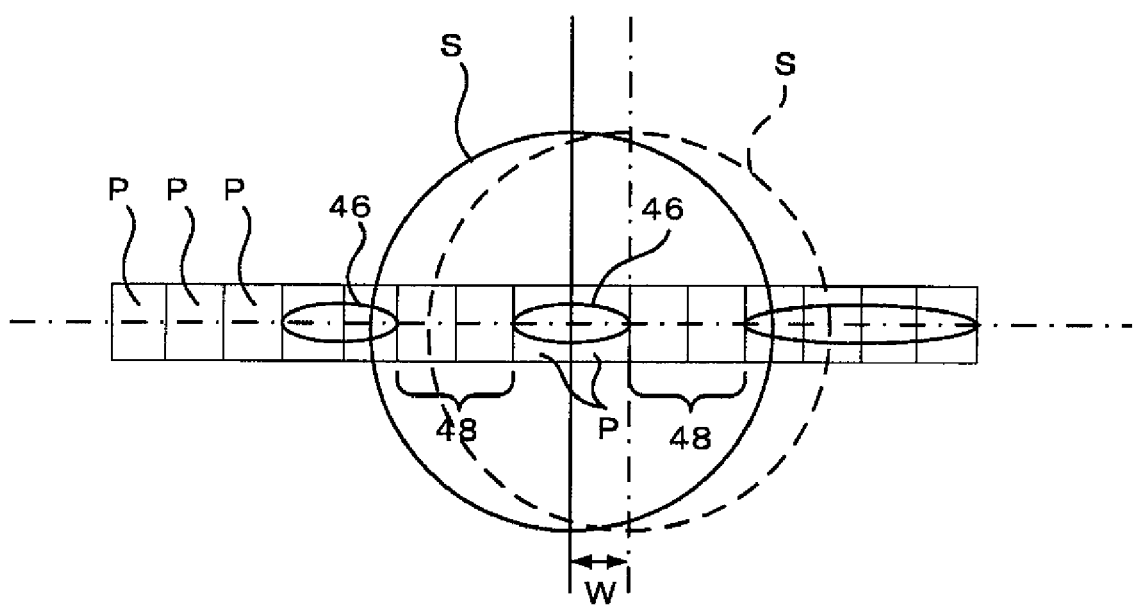
FIG. 3 is an enlarged perspective view showing the state of storing data on an information recording layer of the optical recording medium.

How much amount of data can be recorded and stored per unit length which the laser beam Z travels in the information recording layers 20, 22, and 24, in other words, how long the laser beam Z travels per unit clock (time) for deciding the timing of recording and reading determines the, linear recording density. For example, when LV represents the relative linear velocity between the optical recording medium 1 and the laser beam when recording and f represents a channel bit frequency when recording, as shown in FIG. 3, the distance W (hereinafter, W represents the length of a channel bit P) which the laser beam Z travels in the information recording layer during a clock period T is expressed by LV/f. It means that the shorter the distance W is, the larger the recording capacity becomes. In the present embodiment, the length W of the channel bit P is set to 62 nm. Thus, in order to increase the linear recording density, it is necessary to increase the channel bit frequency f when recording or slow the linear velocity LV when recording.

In the present embodiment, a encode signal is set to (1, 7)RLL. A minimum recording mark 46 is a 2 T mark and a minimum space 48 is a 2 T space. As a result, the length 2 W of the minimum recording mark 46 and the minimum space 48 is expressed by 2 W=2 LV/f, and more specifically, is set to 124 nm. Thus, in the present embodiment, the physical length $d_{min}$ of the minimum recording mark 46 satisfies $d_{min}$ <1.1× (λ/4)/NA, in other words, is within the range of $d_{min}$ <131 nm. In this range, the amplitude of a continuous signal of the minimum marks and the minimum spaces becomes small so that a binary signal cannot be detected at a jitter level.

When λ (405 nm) represents the wavelength of the laser beam and NA (0.85) represents the numerical aperture of the objective lens, the diameter D of a beam spot S of the laser beam Z is expressed by λ/NA, that is, is set to 476 nm. As a result, the beam spot S contains approximately 6.4 channel bits P in the present embodiment.

Next, the PRML processing unit 110 and a PRML (Partial Response Maximum Likelihood) detection method will be described. In the PRML detection method, a reference class characteristic of the PR (partial response) is appropriately selected in accordance with reading characteristics. For example, a case where a constraint length 5 (1, 2, 2, 2, 1) characteristic is selected as the reference class characteristic of the PR is taken as an example. The constraint length 5 (1, 2, 2, 2, 1) characteristic means that a reading response to a sign bit (channel bit) "1" constrains adjacent 5 bits including the sign bit "1" and also the waveform of the reading response can be expressed by a sequence of "12221." It means that the reading responses of various sign bits, which are actually recorded, can be expressed by the results of convolution operation of the sequence of "12221." For example, the response to a sign bit sequence of 00100000 is 00122210. In a like manner, the response to a sign bit sequence of 00010000 is 00012221. Accordingly, the response to a sign bit sequence of 00110000 can be obtained by convolution of the foregoing two responses and is 00134431. The response to a sign bit sequence of 001110000 is 001356531. Also, for example, the response to a sign bit sequence 0011111000 is 0013578753. As described above, in the case of the constraint length 5 (1, 2, 2, 2, 1) characteristic, for example, the response obtained by the convolution operation takes 9 levels from 0 to 8.

In a like manner, a constraint length 4 (1, 2, 2, 1) characteristic means that a reading response to a sign bit "1" constrains adjacent 4 bits including the sign bit "1" and also that the waveform of the reading response can be expressed by a sequence of "1221." It means that the reading responses from various sign bits, which are actually recorded, can be expressed by the results of convolution operation of the sequence of "1221." For example, the response to a sign bit sequence of 0010000 is 0012210. In a like manner, the response to a sign bit sequence of 0001000 is 0001221. Accordingly, the response to a sign bit sequence of 0011000 can be obtained by convolution of the foregoing two responses and is 0013431. Furthermore, the response to a sign bit sequence of 00111000 is 00135531. The response to a sign bit sequence of 001111000 is 001356531. As described above, in the case of the constraint length 4 (1, 2, 2, 1) characteristic, a response obtained by the convolution operation takes 7 levels from 0 to 6.

The foregoing responses obtained by the PR class characteristic are on the basis of the assumption of an ideal state. Therefore, the foregoing responses are referred to as ideal responses. The actual responses include noises as a matter of course and hence deviate from the ideal responses. Thus, comparing an actual response including noises with ideal responses estimated in advance, the ideal response which minimizes the difference (distance) from the actual response is selected to obtain a decoded signal (detected signal) from the ideal response. This is called ML (maximum likelihood) detection. For example, taking a case where reading a recorded sign bit "1" provides a read signal which approximates to "1221," if the PRML detection processing using the constraint length 4 (1, 2, 2, 1) is carried out, an ideal response "1221" is selected from the read signal. Then, the ideal response is decoded to provide an detected signal "1."

In the ML detection, for example, the Euclidean distance is used for calculating the difference between an ideal response and an actual response (a response after equalization processing). The Euclidean distance E between an actual response sequence A (=A0, A1, . . . , An) and an ideal response sequence B (=B0, B1, . . . , Bn) is defined as $E=\sqrt{\{\Sigma(Ai-Bi)^2\}}$. Accordingly, a plurality of kinds of ideal responses estimated in advance are compared with an actual response by using the Euclidean distance and ranked in order to select the ideal response (this is called a maximum likelihood ideal response) which has the smallest Euclidean distance.

Figure 4:
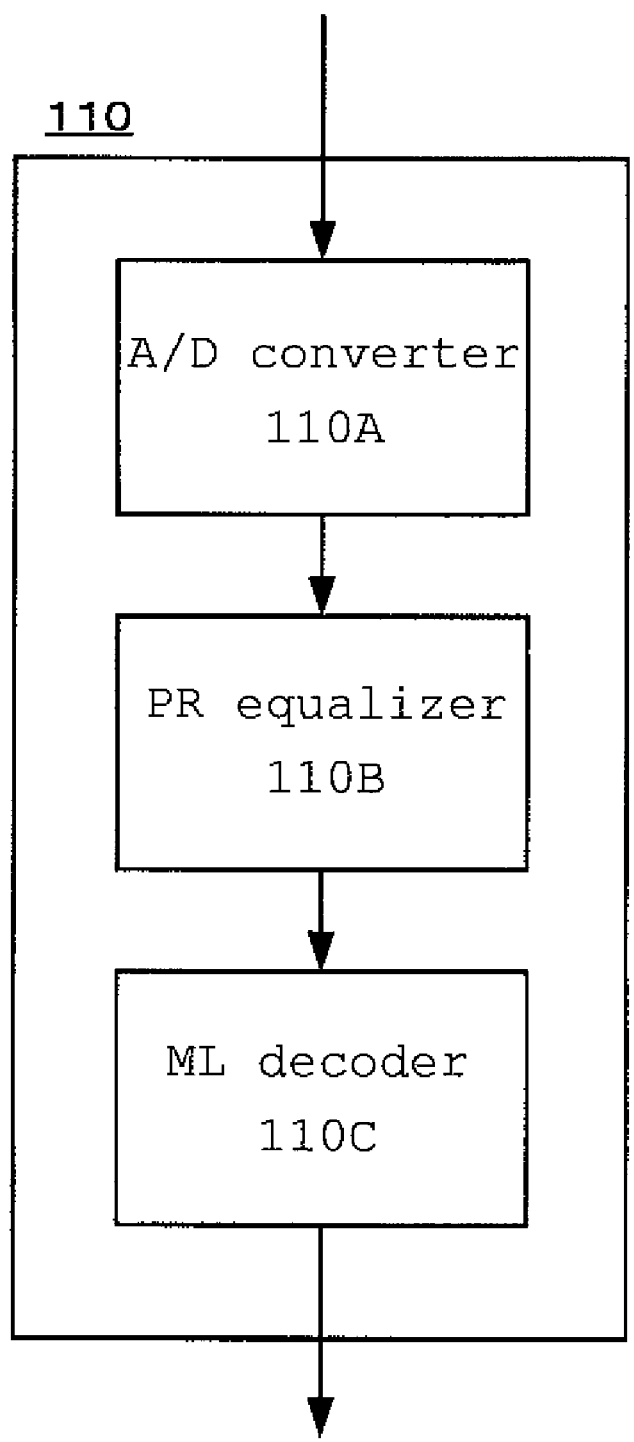
FIG. 4 is a block diagram showing the detailed configuration of a PRML processing unit in the optical reading system.

The PRML processing unit 110 which carries out decoding processing on the basis of the PRML detection method, as shown in FIG. 4, includes an A/D converter 110A, a PR equalizer 110B, and an ML decoder 110C. The A/D converter 110A converts an electrical analog signal detected by the photodetection unit 108 into a digital signal serving as a read signal. The PR equalizer 110B starts sampling of the read signal in accordance with a clock frequency at a certain reference position. The waveform level of a real signal obtained by sampling does not take an integer value because recording marks may be distorted by the effects of the physical and/or chemical characteristics of the material used in the optical recording medium 1 as well as the recording strategy. Thus, the PR equalizer 110B carries out equalization processing so as to approximate a voltage level that does not take an integer value to any level of the reference class characteristic of the referred PR. When the PR reference class is the constraint length 4 (1, 2, 2, 1) characteristic, the ideal response is distributed to 7 levels. Accordingly, there are 7 kinds (7 taps) of equalization coefficients (tap coefficients) which are necessary to equalize a read signal in the PR equalizer 110B.

In this embodiment, a Viterbi decoder is used as the ML decoder 110C, and selects a maximum likelihood ideal response according to a signal equalized by the PR equalizer 110G to obtain an detected signal. To be more specific, the ML decoder 110C calculates the difference (Euclidean distances) between the equalized signal and each estimated ideal response and selects an ideal response which minimizes the difference.

In the present embodiment, the constraint length n in the PRML processing unit 110 is set within the range of an integer n which satisfies $0.5 \times (\lambda/NA)/(LV/f)-1 < n < 0.5 \times (\lambda/NA)/(LV/f)+1$, and more preferably, is set within the range of an integer n which satisfies $0.5 \times (\lambda/NA)/(LV/f) < n < 0.5 \times (\lambda/NA)/(LV/f)+1$. In the present embodiment, since $\lambda/NA=476$ nm and $LV/f=62$ nm as described above, the constraint length n is an integer value within the range as defined by $2.84 < n < 4.84$ (namely, n=3 or 4), and more preferably, is an integer value within the range as defined by $3.84 < n < 4.84$ (namely, n=4). As a result, the constraint length n is determined to 4.

Figure 5:
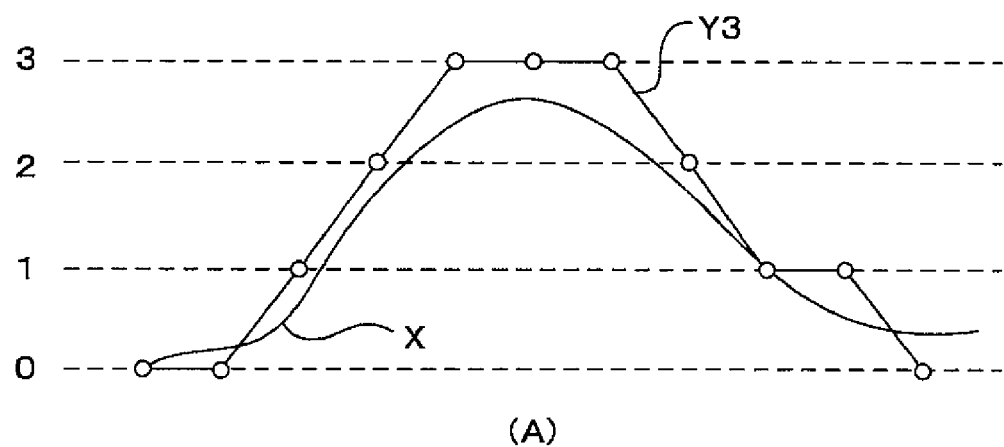
FIG. 5 is a graph which explains the relationship between the constraint length and the equalization processing in the PRML processing unit.
Figure 5:
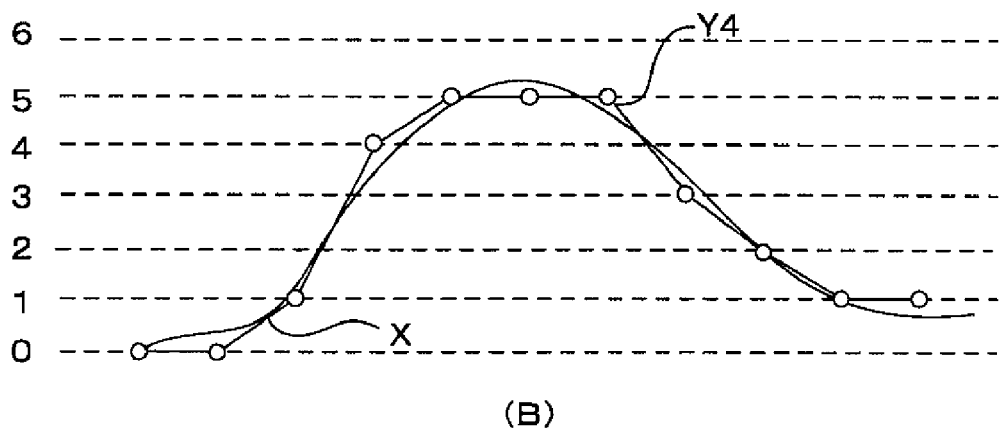
Figure 5:
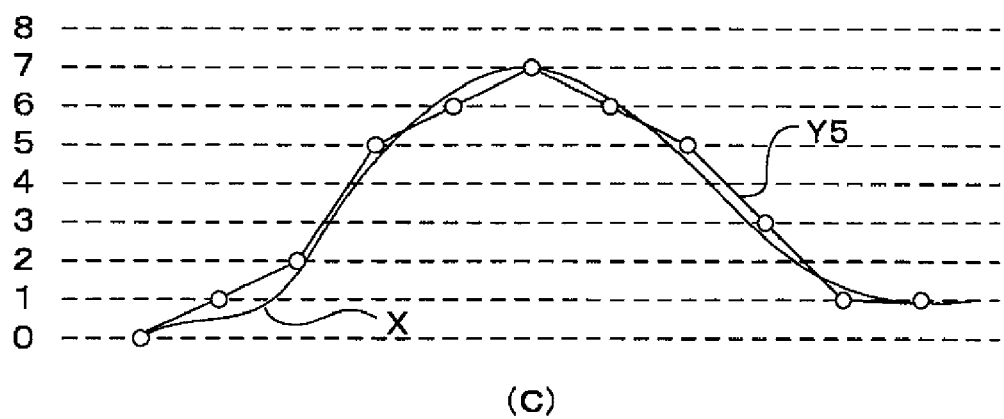

As for the determination of the constraint length 4, it is smaller than constraint length that has been conventionally selected. In the PRML processing unit 110, in general, the larger the constraint length n is, the more preferable it is because reading processing is carried out with higher precision. This is because all channel bits P existing within a beam spot S have some effect on a read signal (its reflected light) so that the read signal should be subjected to the equalization processing with considering as many channel bits P as possible. For example, if it is assumed that irradiating the optical recording medium 1 with the laser beam Z provides a read output X as shown in FIG. 5(A), a response level is subjected to the equalization processing at 4 levels from 0 to 3 in the case of the constraint length 3 (1, 2, 1) so that the equalized output Y3 largely deviates from the read output X. Conversely, as shown in FIG. 5(B), in the case of the constraint length 4 (1, 2, 2, 1), the response level is subjected to the equalization processing at 7 levels from 0 to 6, and the deviation between the equalized output Y4 and the read output X becomes small in comparison with the case of the constraint length 3. Furthermore, as shown in FIG. 5(C), in the case of the constraint length 5 (1, 2, 2, 2, 1), the response level is subjected to the equalization processing at 9 levels from 0 to 8, so that the deviation between equalized output Y5 and the read output X becomes further smaller. As described above, the response level (tap number) of the PR equalizer 110B increases with increase in the number of the constraint length, and accordingly, it becomes possible to decode data with the use of equalized output Y which is close to the actual read output X in the ML decoder 110C. For example, as shown in FIG. 3, when the beam spot S contains 6 or more channel bits P, the constraint length n is set to at least 5, and is preferably set at 6 in general.

In the present embodiment, however, the constraint length n is set with respect to the number of channel bits P contained in the size of approximately half of the beam spot S. In other word, as described above, the constraint length n is an integer which satisfies $0.5 \times (\lambda/NA)/(LV/f)-1 < n < 0.5 \times (\lambda/NA)/(LV/f)+1$, and preferably is an integer which satisfies $0.5 \times (\lambda/NA)/(LV/f) < n < 0.5 \times (\lambda/NA)/(LV/f)+1$. The inventors have found that, when the constraint length n is set within such ranges, it is possible to keep the decoding quality provided by the PRML processing unit 110 at high level even if extraneous matters adhere to the surface of the optical recording medium 1 or the surface is scratched. In particular, when the constraint length n is set within the range of $0.5 \times (\lambda/NA)/(LV/f) < n < 0.5 \times (\lambda/NA)/(LV/f)+1$, it is possible to provide an optical reading system 100 and an optical reading method which are superior in increase in linear density and resistance against a fingerprint.

According to a reason which the inventor assumes, in an ideal state where extraneous matters and the like do not adhere to the optical recording medium 1, subjecting the read output X to the equalization processing at as many levels as possible can increase precision in decoding, as shown in FIG. 5(C). However, in practice, there is a case where a fingerprint and the like adhere to the surface of the optical recording medium 1 or the surface is scratched, and accordingly, a read output deviates from the read output X which should be originally obtained. In the case of such a read output containing an error, if the constraint length n is set large in the PR equalizer 110B, the equalized output Y directly reflects the error. As a result, the ML decoder 110C decodes data with the use of the wrong equalized output Y and hence a reading error may occur.

In the present embodiment, the physical length $d_{min}$ of the minimum recording mark 38 recorded in the information recording layers 20, 22, and 24 satisfies $d_{min} < 1.1 \times (\lambda/4)/NA$. Binary reading at a jitter level cannot be carried out in such a condition, but stable reading can be carried out in the present embodiment by the PRML detection method with the constraint length 4. Also, the present embodiment includes cases where the distance from the light incident surface 38A of the optical recording medium 1 to the L2 information recording layer 24 is 80 μm or less, and, in particular, is 75 μm or less. In such environment, signal quality is likely to deteriorate due to an error in the shape of the optical recording medium 1. Using the optical reading system 100 according to the present embodiment, however, makes it possible to decode data with high precision by the PRML detection method even if the quality of read signal output deteriorates.

Also, if an information recording layer is displaced within a distance range of 100 μm away from the light incident surface 38A, a sufficiently low error rate can be obtained. Thus, it is possible to provide multiple layers at distances of 100 μm or less away from the light incident surface 38A as with the present embodiment, and in particular, the L2 information recording layer 24 can be displaced at a distance of 75 μm or less. Accordingly, both multilayer and high density can be achieved, so that it becomes possible to increase the recording capacity of the optical recording medium 1.

EXAMPLE AND COMPARATIVE EXAMPLE

As an example, a case where an optical recording medium 1 which is provided with a single information recording layer is read using an optical reading system 100 will be described. It should be important to note that the present invention is not limited to such a particular example.

<Manufacturing of Sample Medium>

First, a substrate 10 was manufactured by injection molding. In the surface of the substrate 10, a spiral groove with a track pitch of 0.32 µm was formed. A polycarbonate resin was used as the material forming the substrate 10. The thickness of the substrate 10 was set to 1.1 mm and the diameter thereof was set to 120 mm.

Then, the substrate 10 was set on a sputtering apparatus and an information recording layer having a thickness of 48 nm was stacked on the surface of the substrate 10 on the side of the formed groove. To be more specific, the information recording layer was composed of bismuth (Bi), oxygen (O), and germanium (Ge) and the composition ratio (atm %) thereof was set at Bi:O:Ge=22:64:14.

Then, the substrate 10 on which the information recording layer was formed was set on a spin coating apparatus, and an acrylic ultraviolet curable resin was dripped onto the substrate 10 while the substrate 10 was rotated for spin coating. After that, a light-transmitting stamper having a spiral groove pattern was pressed against the surface of the spin coated resin. Then the resin was cured by irradiation with ultraviolet rays. By removing the light-transmitting stamper off after curing, a cover layer with a thickness of 48 µm which was provided with the spiral groove was formed.

Then, after an UV/electron beam curable hard coating agent was applied onto the cover layer by spin coating, a diluent solvent inside a coating was removed by heating it for three minutes in the atmosphere so that an uncured hard coat material layer was formed. A surface material solution was applied onto the uncured hard coat material layer by spin coating. Note that the surface material solution had been prepared by adding, to a fluoride solvent (99.5 parts by weight), perfluoropolyether diacrylate (0.33 parts by weight, with the molecular weight of approximately 2000) and 3-perfluorooctyl-2-hydroxypropylacrylate (0.17 parts by weight). After that, the hard coat material layer was dried at 60 degrees centigrade for three minutes, and then the hard coat material layer and the surface material solution were simultaneously cured by irradiation with an electron beam under a stream of nitrogen to complete a hard coat layer having a thickness of 2 µm. As for the irradiation with the electron beam, an electron beam irradiation apparatus "Curetron" (made by NHV Corporation) was used with the conditions of electron beam acceleration voltage of 200 kV and irradiation dose of 5 Mrad. The concentration of oxygen in the irradiation atmosphere was 80 ppm. In such a manner, the optical recording medium 1 which had a distance of 50 µm from a light incident surface to the information recording layer was obtained.

Six kinds of optical recording media 1 were manufactured in total in the same procedure while varying the thickness of the cover layer among 58 µm, 68 µm, 78 µm, 88 µm, and 98 µm so as to vary the distance from the light incident surface to the information recording layer among 60 µm, 70 µm, 80 µm, 90 µm, and 100 µm.

<Formation of Artificial Fingerprint>

Then, an artificial fingerprint was made adhere to the light incident surface 38A of each of the optical recording media 1. Before the procedure of adhesion of the artificial fingerprint, an artificial fingerprint solution serving as a material for the artificial fingerprint was prepared by mixing Kanto loam (0.4 parts by weight) of Test Powder 1 Class 11 (a median diameter of 1.6 to 2.3 µm) as defined in JIS Z8901 being powder of fine particles, triolein (1.0 parts by weight) functioning as a dispersion medium, and methoxypropanol (10.0 parts by weight) functioning as a diluent.

Then, an original form for transferring an artificial fingerprint pattern was manufactured. To be more specific, approximately 1 mL of the artificial fingerprint solution was taken while stirring well by a magnetic stirrer, and then the artificial fingerprint solution was applied onto a polycarbonate substrate (with a diameter of 120 mm and a thickness of 1.2 mm) by spin coating. Then, the substrate was heated to 60 degrees centigrade for three minutes to completely remove methoxypropanol, which was an unnecessary diluent. The original form for transferring the artificial fingerprint pattern was obtained in such a manner.

Furthermore, a smaller end face (with a diameter of 12 mm) of a No. 1 silicone rubber plug was evenly polished using #240 sandpaper (having performance equal to JIS-defined AA240 sandpaper) to form an artificial fingerprint transferring member (serving as an artificial fingertip). The polished end face of the artificial fingerprint transferring member was pressed against the original form with a load of 4.9 N for ten seconds to shift an artificial fingerprint solution ingredient to the end face of the transferring member. Furthermore, the operation of pressing the end face of the transferring member against the polycarbonate substrate with a load of 4.9 N for ten seconds was sequentially carried out three times in different positions of the polycarbonate substrate in order to reduce the amount of adhesion of the artificial fingerprint solution ingredient in advance.

The end face of the artificial fingerprint transferring member which had been prepared like this was pressed against the light incident surface 38A of the hard coat layer 38 of the optical recording medium 1 in a position at about 40 mm away from the center in a radial direction with a load of 29 N for ten seconds. Thus, the artificial fingerprint solution ingredient was transferred to the light incident surface 38A to form an artificial fingerprint.

EVALUATION OF EXAMPLE

Information was recorded on the optical recording medium 1, to which the artificial fingerprint had adhered, with the use of the optical reading system 100. As for recording conditions by the optical reading system 100, the wavelength λ of the laser beam Z was set to 405 nm, the numerical aperture NA of the objective lens 106A was set to 0.85, the channel bit frequency f when recording was set to 66 MHz, and the linear velocity LV of the optical recording medium 1 the rotation of which was controlled by the spindle driver 114 when recording was set to 4.1 m/s. Also, predetermined information was recorded on the following conditions: recording power Pw=8.3 mW, erasing power Pe=3.2 mW, and cooling power Pb=0.1 mW as optimal recording power conditions.

Then, the optical recording medium 1 was read by the optical reading system 100 to evaluate its quality. In the optical reading system 100 when reading, the wavelength λ of the laser beam Z was set to 405 nm, the numerical aperture NA of the objective lens 106A was set to 0.85, the clock frequency f of the optical reading system was set to 64.8 MHz, and the linear velocity LV of the optical recording medium 1 the rotation of which was controlled by the spindle driver 114 was set to 4.03 m/s. Furthermore, the constraint length n of the PRML processing unit 110 in the optical reading system 100 was set to 4 (1221). The reason for setting the constraint length n at 4 was that the following equation using recording conditions, that is, wavelength λ=405 nm, the numerical aperture NA=0.85, the channel bit frequency f=66

MHz, and the linear velocity LV when recording=4.1 m/s was satisfied: $0.5\times(\lambda/NA)/(LV/f)<n<0.5\times(\lambda/NA)/(LV/f)+1$, namely, $3.84<n<4.84$.

Figure 6:
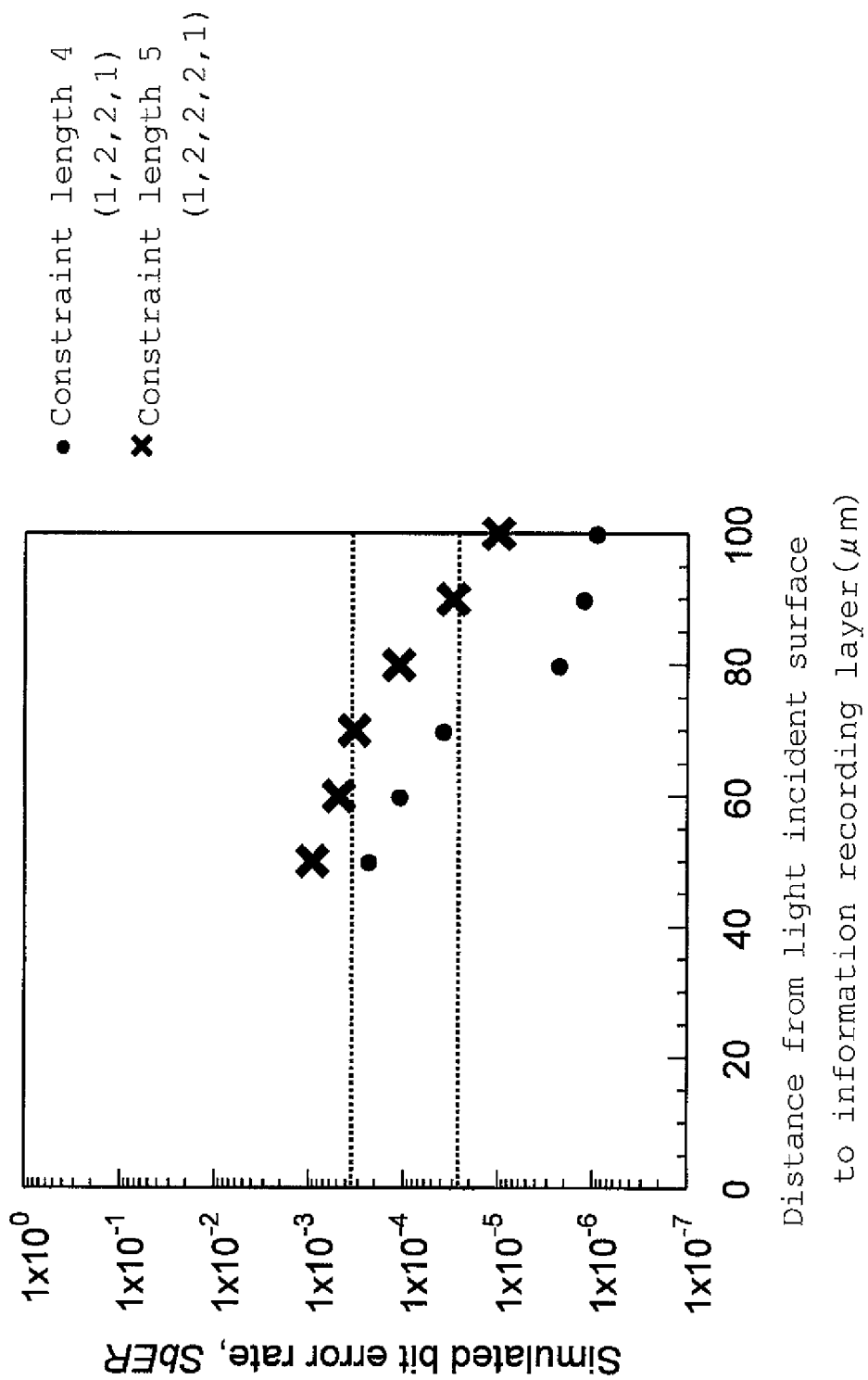
FIG. 6 is a graph showing the results of signal quality evaluation according to an example and a comparative example of the present invention.

SbER was used as a performance index of reading quality by the optical reading system 100. According to the SbER (simulated bit error rate), SAM values of a plurality of read signals were calculated and the probability of occurrence of wrong detection was evaluated on the basis of the average and standard deviation of normal distribution which was obtained by a plurality of SAM values. The smaller the value of SbER is, the more superior signal quality is. An SbER measurement unit manufactured by Pulstec Industrial Co., Ltd. was used here. FIG. 6 shows the results of evaluation.

According to the present embodiment, if the artificial fingerprint (extraneous matter 50) adhered to the optical recording medium 1 and the information recording layer 26 was close to the light incident surface 38A by approximately 50 μm, it is found that the reading quality was better than the allowable limitation of SbER=$3.5\times10^{-4}$ with extraneous matters. Also, when the information recording layer 26 was displaced at a distance of approximately 80 μm away from the light incident surface 38A, it is found that the reading quality was less than SbER=$2.5\times10^{-5}$ being an allowable criterion under normal conditions even if a fingerprint adhered. Therefore, if the information recording layer 26 is displaced at a distance of approximately 75 μm away from the light incident surface 38A, a sufficiently superior signal reading characteristic can be obtained.

<Comparative Evaluation Experiment>

As a comparative example, FIG. 6 shows the results of reading the sample media used in the example by an optical reading system with constraint length 5 (12221). The used optical reading system had the same configuration as the foregoing optical reading system 100 except that the constraint length was set to 5. In the comparative example, when the information recording layer 26 was displaced at a distance of approximately 80 μm or less away from the light incident surface 38A, the SbER deteriorated and exceeded SbER=$2.5\times10^{-5}$ being an allowable criterion under normal conditions so that signal reading quality deteriorated. In particular, when the distance from the light incident surface 38A to the information recording layer was 75 μm or less, and in particular, 70 μm or less, the SbER exceeded SbER=$3.5\times10^{-4}$ being an allowable criterion under abnormal conditions so that the quality further deteriorated to the extent that the read information was substantially useless.

Although not specifically illustrated, in a condition that the artificial fingerprint had not adhered to the optical recording medium 1, it was confirmed that the signal quality SbER of the optical reading system with the constraint length 5 became $1.0\times10^{-8}$ or less and an error free state was substantially obtained. In the optical reading system with the constraint length 4, the SbER became $7.0\times10^{-7}$. Although it is within the allowable range, the signal quality was lower than that when using the constraint length 5.

As is apparent from the foregoing example, in the optical reading system according to the embodiment of the present invention, the constraint length is set to approximately half of the number of channel bits contained in the beam spot of the laser beam so as to rationally achieve both the improvement in the characteristic of fingerprint resistance and the increased recording capacity.

In the foregoing embodiment, the distance between the light incident surface and the information recording layer of the optical recording medium 1 is set to 80 μm or less, and is more preferably set at 75 μm or less. However, the present invention is not limited thereto as long as the information recording layer is stacked within the range of at least less than 100 μm.

In the present embodiment, the optical recording medium has four information recording layers, but the present invention is not limited thereto. The optical recording medium may have a single information recording layer, two or three information recording layers, or five or more information recording layers. In the present embodiment, all of the four information recording layers are stacked at distances of 100 μm or less away from the light incident surface, but the present invention is not limited thereto. Part of the information recording layers may be stacked at a position of 100 μm or more away. Furthermore, in the foregoing example, the signal quality was actually evaluated with varying the thickness of the cover layer at multiple stages in the optical recording medium with a single layer. However, this corresponds to the case of varying the position of the information recording layer which is the nearest from the light incident surface in a multilayer recording medium. Accordingly, the present invention is not limited to the case of the single layer, but includes the case of multilayer.

Using an optical reading system and the like according to the present invention makes it possible to prevent deterioration in read signal quality due to the adhesion of extraneous matters and to increase recording density in various optical recording mediums for storing data.

The entire disclosure of Japanese Patent Application No. 2007-236269 filed on Sep. 12, 2007 including specification, claims, drawings, and summary are incorporated herein by reference in its entirety.

What is claimed is:

1. An optical reading method for reading information recorded on an information recording layer by a PRML detection method by irradiating an optical recording medium, in which a distance from a light incident surface to the information recording layer is less than 100 μm, with a laser beam through an objective lens, wherein the distance from the light incident surface to an information recording layer which is the nearest from the light incident surface is 80 μm or less; and a constraint length n in the PRML detection method is set to an integer which satisfies $0.5\times(\lambda/NA)/(LV/f)-1<n<0.5\times(\lambda/NA)/(LV/f)+1$, wherein λ represents a wavelength of a laser beam, NA represents a numerical aperture of the objective lens, LV represents a linear velocity of the optical recording medium when recording, and f represents a channel bit frequency when recording.

2. The optical reading method according to claim 1, wherein the constraint length n is set to an integer which satisfies $0.5\times(\lambda/NA)/(LV/f)<n<0.5\times(\lambda/NA)/(LV/f)+1$.

3. The optical reading method according to claim 1, wherein, when $d_{min}$ represents a physical length of a minimum mark recorded on the information recording layer, the $d_{min}$ satisfies $d_{min}<1.1\times(\lambda/4)/NA$.

4. The optical reading method according to claim 2, wherein, when $d_{min}$ represents a physical length of a minimum mark recorded on the information recording layer, the $d_{min}$ satisfies $d_{min}<1.1\times(\lambda/4)/NA$.

5. The optical reading method according to claims 1, wherein an expression of $(\lambda/NA)/(LV/f)>6$ is satisfied, where λ represents the wavelength of the laser beam, NA represents the numerical aperture of the objective lens, LV represents the linear velocity of the optical recording medium when recording, and f represents the channel bit frequency when recording.

6. The optical reading method according to claims 2, wherein an expression of $(\lambda/NA)/(LV/f)>6$ is satisfied, where $\lambda$ represents the wavelength of the laser beam, NA represents the numerical aperture of the objective lens, LV represents the linear velocity of the optical recording medium when recording, and f represents the channel bit frequency when recording.

7. The optical reading method according to claim 3 wherein an expression of $(\lambda/NA)/(LV/f)>6$ is satisfied, where $\lambda$ represents the wavelength of the laser beam, NA represents the numerical aperture of the objective lens, LV represents the linear velocity of the optical recording medium when recording, and f represents the channel bit frequency when recording.

8. The optical reading method according to claim 5, wherein an expression of $(\lambda/NA)/(V/f)>7$ is satisfied, where $\lambda$ represents the wavelength of the laser beam, NA represents the numerical aperture of the objective lens, LV represents the linear velocity of the optical recording medium when recording, and f represents the channel bit frequency when recording.

9. The optical reading method according to claims 1, wherein the distance from the light incident surface to the information recording layer is 80 μm or less.

10. The optical reading method according to claim 1, wherein the distance from the light incident surface to the information recording layer which is the nearest from the light incident surface, is 75 μm or less.

11. The optical reading method according to claim 1, wherein the optical recording medium is provided with a plurality of information recording layers.

12. The optical reading method according to claim 3, wherein the optical recording medium is provided with a plurality of information recording layers.

13. The optical reading method according to claim 5, wherein the optical recording medium is provided with a plurality of information recording layers.

14. An optical reading method for reading information recorded on an information recording layer by a PRML detection method by irradiating an optical recording medium, in which a distance from a light incident surface to the information recording layer is less than 100 μm, with a laser beam through an objective lens, wherein
the distance from the light incident surface to an information recording later which is the nearest from the light incident surface is 80 μm or less; and
a constraint length n in the PRML detection method is set to an integer which satisfies $0.5\times(\lambda/NA)/W-1<n<0.5\times(\lambda/NA)/W+1$, wherein $\lambda$ represents a wavelength of the laser beam, NA represents a numerical aperture of the objective lens, and W represents a length of a channel bit when recording.

15. An optical reading system comprising:
a rotation driving unit for rotating an optical recording medium in which a distance from a light incident surface to an information recording layer is less than 100 μm and a distance from the light incident surface to the information recording layer which is the nearest from the light incident surface is 80 μm or less;
a laser beam source for generating a laser beam;
an objective lens for collecting the laser beam to irradiate the optical information recording medium with;
a photoelectric conversion unit for receiving reflected light of the laser beam and converting it into an electrical signal; and
a PRML processing unit for reading a signal by a PRML detection method on the basis of the electrical signal, wherein
a constraint length n in the PRML processing unit is set to an integer which satisfies $0.5\times(\lambda/NA)/(LV/f)-1<n<0.5\times(\lambda/NA)/(LV/f)+1$, wherein $\lambda$ represents a wavelength of the laser beam, NA represents a numerical aperture of the objective lens, LV represents a linear velocity of the optical recording medium when recording, and f represents a clock frequency of a reading system.

* * * * *